(12) United States Patent
Zhao et al.

(10) Patent No.: US 7,453,691 B2
(45) Date of Patent: Nov. 18, 2008

(54) MOUNTING APPARATUS FOR DATA STORAGE DEVICES

(75) Inventors: Peng Zhao, Shenzhen (CN); Chun-Chi Liang, Taipei Hsien (TW); Chien-Li Tsai, Taipei Hsien (TW); Ke-Cheng Lin, Taipei Hsien (TW)

(73) Assignees: Hong Fu Jin Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 74 days.

(21) Appl. No.: 11/558,466

(22) Filed: Nov. 10, 2006

(65) Prior Publication Data

US 2007/0211425 A1  Sep. 13, 2007

(30) Foreign Application Priority Data

Mar. 10, 2006  (CN) .................. 2006 1 0034353

(51) Int. Cl.
*G06F 1/16* (2006.01)
(52) U.S. Cl. .................. 361/685; 440/89 R; 180/338; 360/264.2
(58) Field of Classification Search ............. 248/27.1, 248/213.2, 263; 440/61 D, 61 R, 53, 89 R; 180/295, 338; 360/97.01, 264.2; 361/679–687, 361/724–727
See application file for complete search history.

(56) References Cited

U.S. PATENT DOCUMENTS

| | | | | |
|---|---|---|---|---|
| 6,297,954 B1 * | 10/2001 | Seo | ............................ | 361/686 |
| 7,277,279 B2 * | 10/2007 | Chen et al. | .................. | 361/685 |
| 7,304,840 B2 * | 12/2007 | Chen et al. | .................. | 361/685 |

FOREIGN PATENT DOCUMENTS

GN    2554699 Y    6/2003

* cited by examiner

*Primary Examiner*—Hung V Duong
(74) *Attorney, Agent, or Firm*—Wei Te Chung

(57) ABSTRACT

A mounting apparatus for mounting a data storage device that has a protrusion protruding from a sidewall thereof includes a mounting board, and a bracket. The mounting board includes a depressed portion for holding the data storage device. The depressed portion includes a first side wall. The bracket includes a leg member with an end pivotably mounted to the first side wall of the depressed portion of the mounting board. A first receiving slot for receiving the protrusion of the data storage device is defined in a bottom of the leg member. A drive portion is formed at a side of the receiving slot away from the end of the leg member, for cooperating with a corresponding protrusion of the data storage device when installing the data storage device.

20 Claims, 8 Drawing Sheets

MOUNTING APPARATUS FOR DATA STORAGE DEVICES

BACKGROUND OF THE INVENTION

1. Field of the Invention

The present invention relates to mounting apparatuses, and particularly to a mounting apparatus which readily allows securely installing or removing a data storage device to or from a computer enclosure.

2. Description of Related Art

Generally, in the enclosure of a typical portable computer, there is a hard disk drive (HDD) mounted therein. There are many ways to secure the HDD in the enclosure. One way is by inserting a connector of the HDD into a socket of a motherboard of the portable computer. When assembling the HDD, users need to push the HDD into the enclosure of the portable computer until the connector of the HDD is inserted into the socket of the motherboard. However, strength of the users is not easily controlled. When the users apply too much strength when pushing the HDD, the connector and the socket may be damaged. Contrarily, when the users apply too little strength pushing HDD, a good connection of the connector of the HDD with the socket may not occur, which would influence data transmission between the HDD and the motherboard.

What is desired, therefore, is a mounting apparatus which readily allows securely installing or removing a data storage device to or from a computer enclosure.

SUMMARY OF THE INVENTION

An exemplary mounting apparatus for mounting a data storage device that has a protrusion protruding from a sidewall thereof includes a mounting board, and a bracket. The mounting board includes a depressed portion for holding the data storage device. The depressed portion includes a first side wall. The bracket includes a leg member with an end pivotably mounted to the first side wall of the depressed portion of the mounting board. A first receiving slot for receiving the protrusion of the data storage device is defined in a bottom of the leg member. A drive portion is formed at a side of the receiving slot away from the end of the leg member, for cooperating with a corresponding protrusion of the data storage device when installing the data storage device.

Other advantages and novel features will become more apparent from the following detailed description when taken in conjunction with the accompanying drawings, in which:

DETAILED DESCRIPTION OF THE INVENTION

Figure 1:
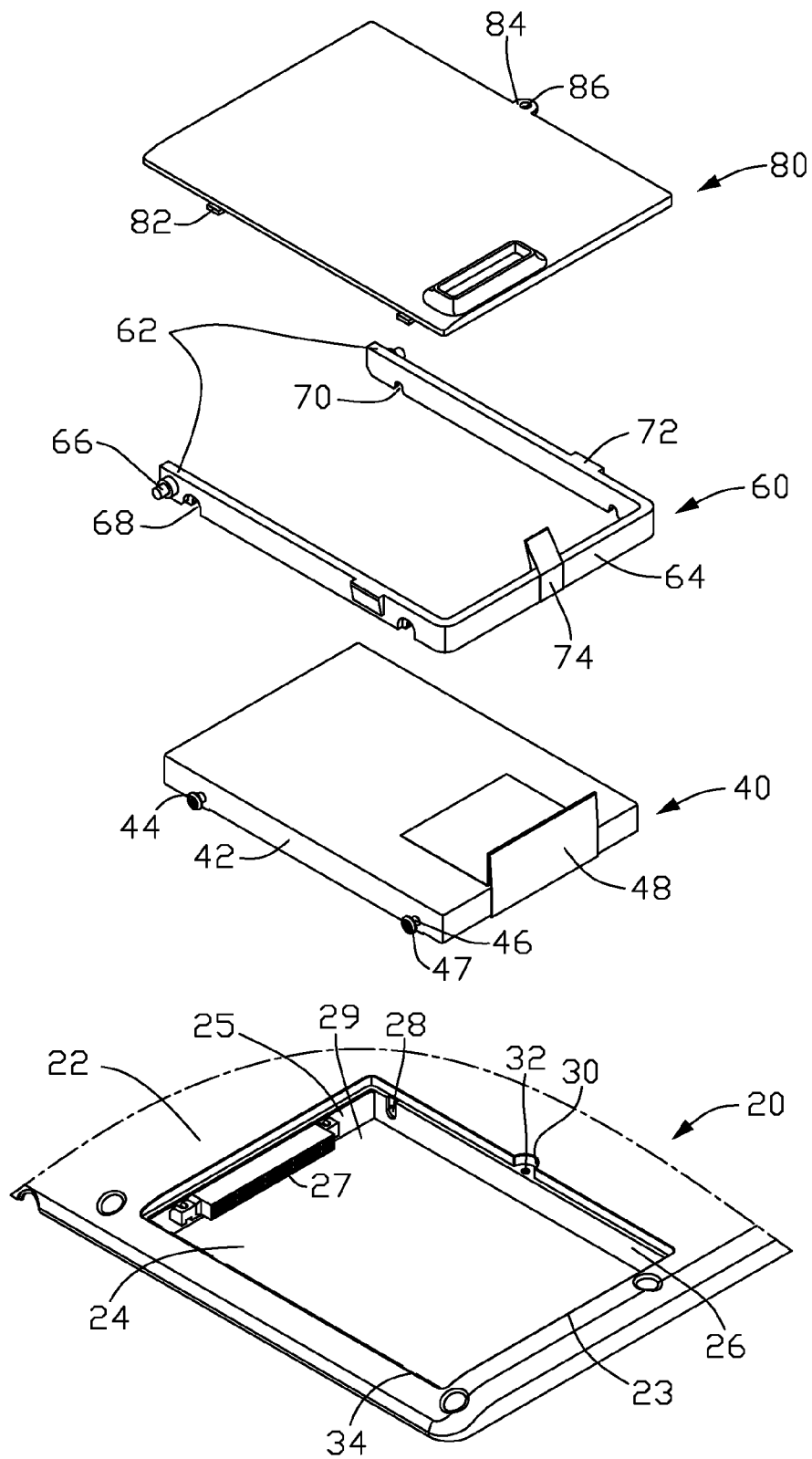
FIG. 1 is an exploded, isometric, view of a mounting apparatus for a data storage device in accordance with a preferred embodiment of the present invention, together with a data storage device that has two protrusions on each sidewall, the mounting apparatus includes an enclosure, a bracket, and a cover, the enclosure is partially shown.
Figure 2:
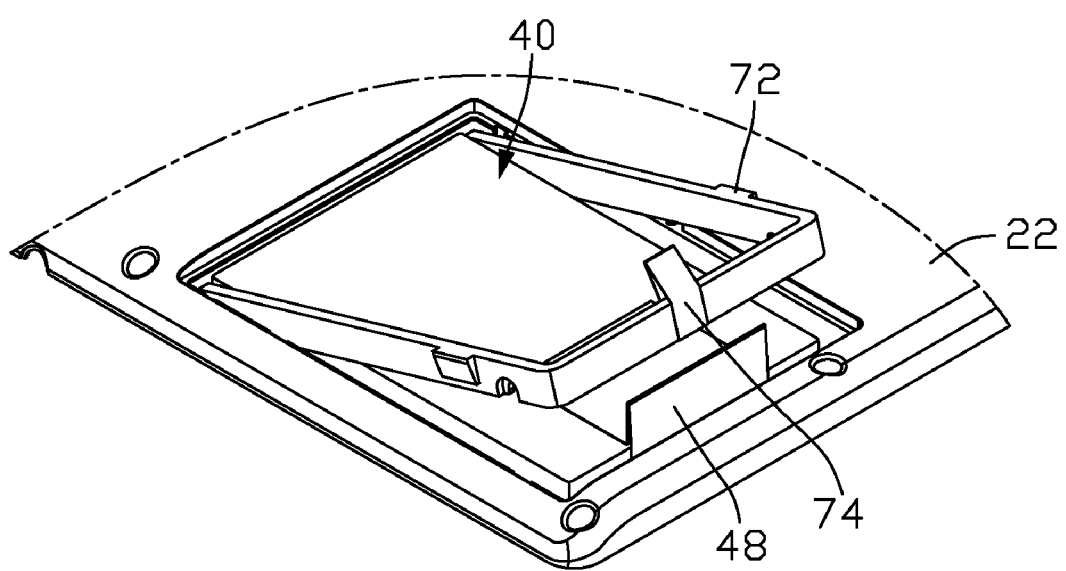
FIG. 2 is an assembled view of FIG. 1, but not showing the cover, and showing the bracket in an unlocked state.

Referring to FIG. 1, a mounting apparatus of an electronic device such as a portable computer in accordance with a preferred embodiment of the present invention is shown for mounting a functional component such as a data storage device 40 to the portable computer. The mounting apparatus includes an enclosure 20, a bracket 60, and a cover 80.

Figure 3:
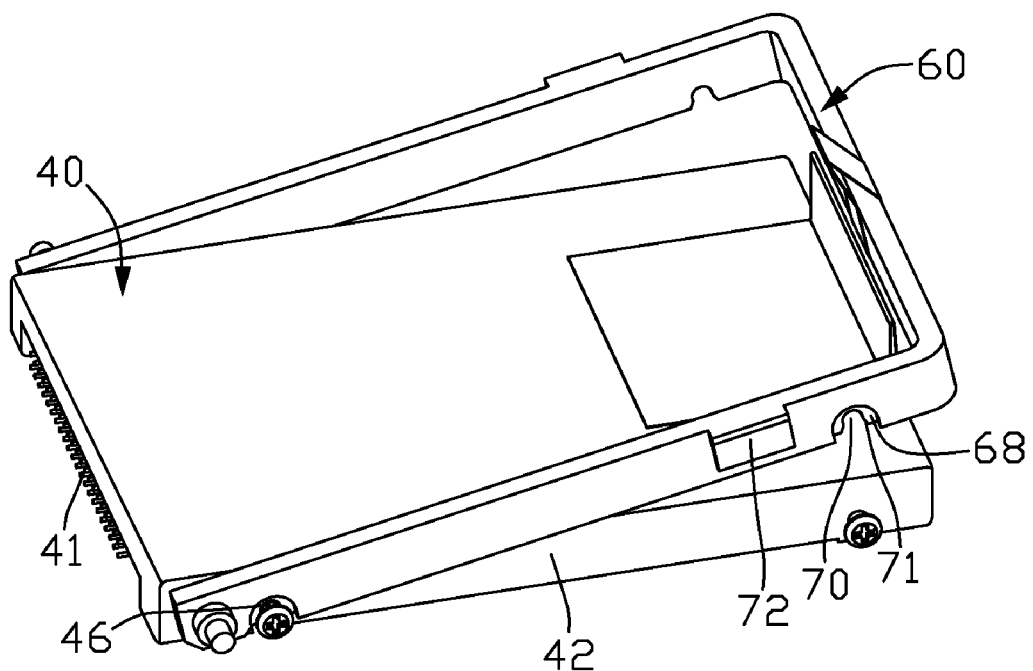
FIG. 3 is similar to FIG. 2, but not showing the enclosure, and viewed from another aspect.
Figure 4:
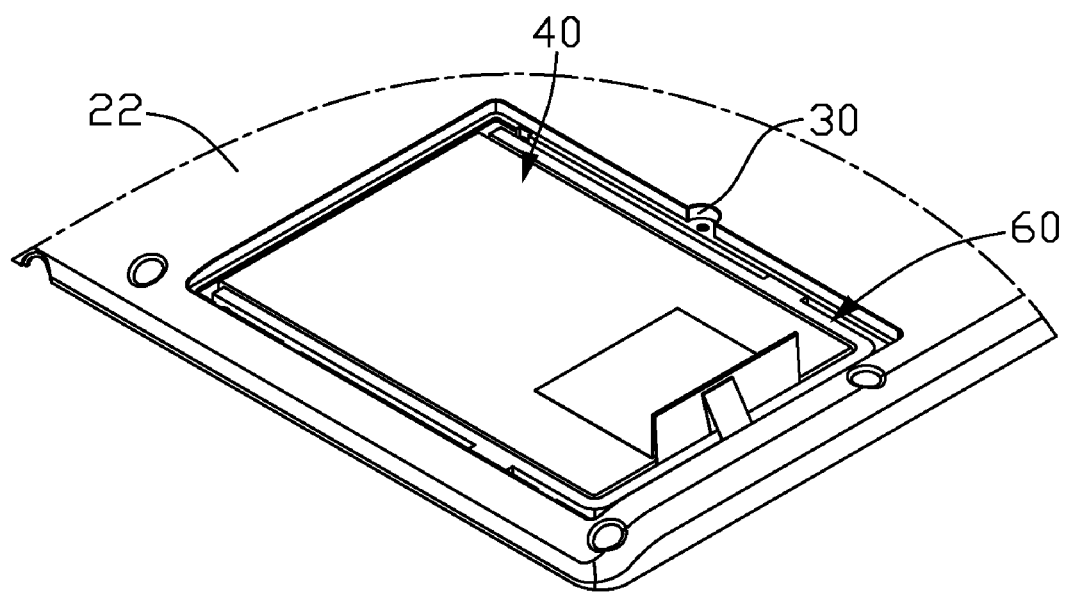
FIG. 4 is an assembled view of FIG. 1, but not showing the cover, and showing the bracket in a locked state.
Figure 5:
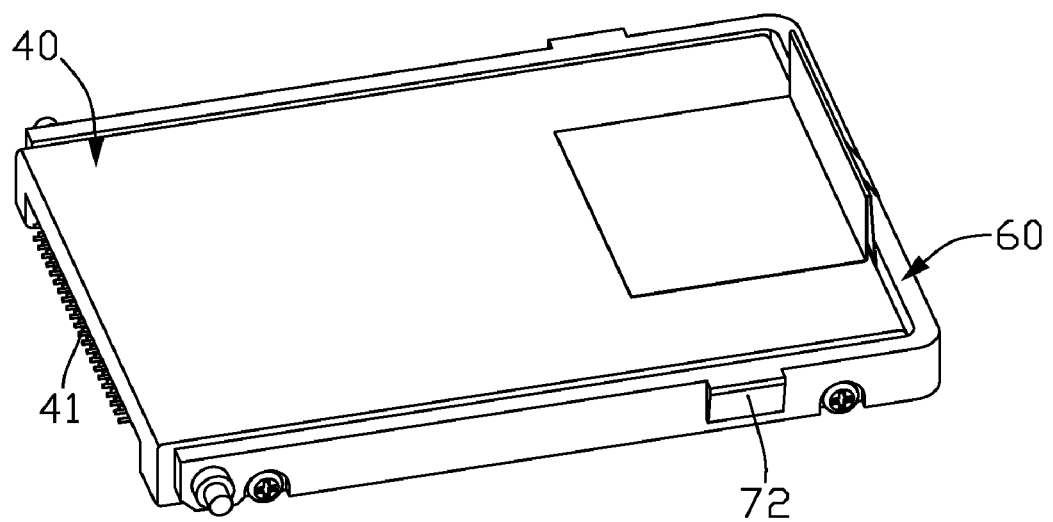
FIG. 5 is similar to FIG. 4, but not showing the enclosure.
Figure 6:
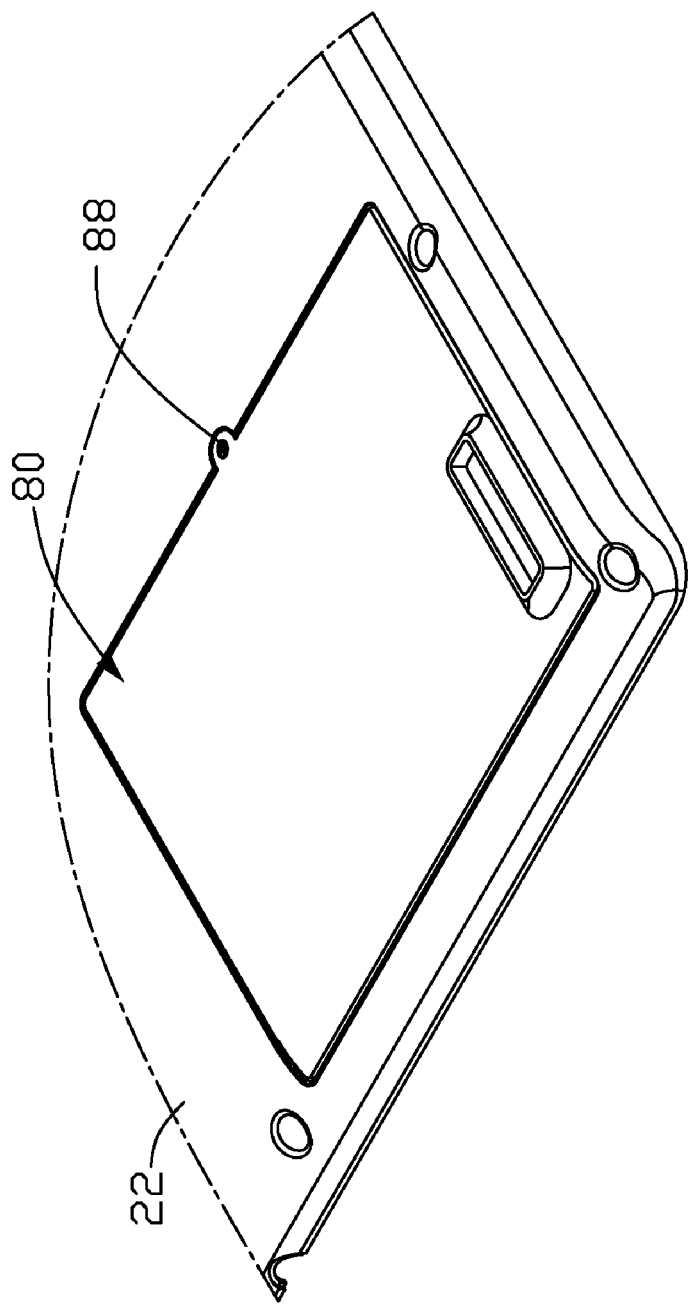
FIG. 6 is an assembled view of FIG. 1.
Figure 7:
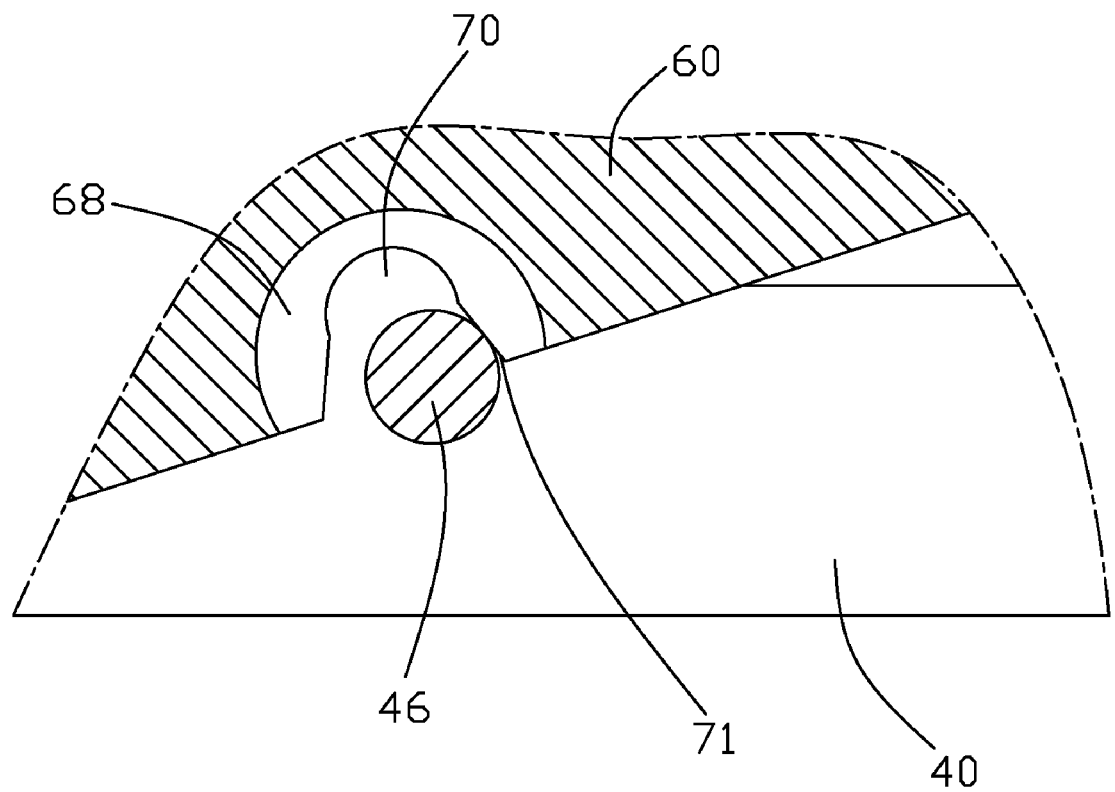
FIG. 7 is a partial, sketch view of FIG. 3, showing the bracket cooperating with one protrusion of the data storage device.
Figure 8:
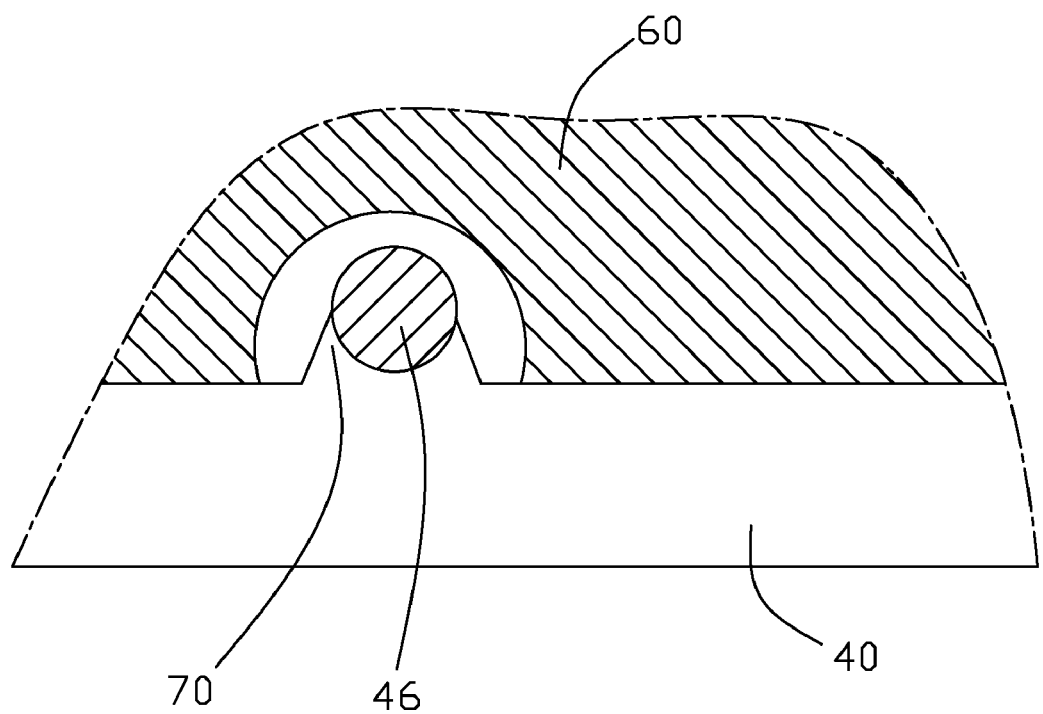
FIG. 8 is similar to FIG. 7, but showing the protrusion of the data storage device blocked by the bracket.

The data storage device 40 such as a hard disk drive (HDD) includes two protrusions 44 protruding from each sidewall 42 thereof. Each protrusion 44 includes a neck portion 46 engaged with the data storage device 40, and a head portion 47 located at a distal end of the neck portion 46. The data storage device has a male connector 41 (see FIG. 3) mounted at a rear end of the data storage device 40, and a flexible first operating member 48 mounted at a front end of the data storage device 40.

The enclosure 20 includes a mounting board 22. The mounting board 22 includes a depressed portion. The depressed portion having a stepped shape has an inner depressed portion at a lower portion thereof for holding the data storage device 40, and an outer depressed portion at an upper portion thereof for holding the cover 80. The depressed portion includes a bottom wall 24, two side walls 26 located at opposite sides of the bottom wall 24, a first end wall 25 connected between corresponding ends of the side walls 26, and a second end 23 connected between the side walls 26 and opposite to the first end wall 25. The bottom wall 24, lower portions of the side walls 26, and lower portions of the first and second end walls 25, 23 together form the inner depressed portion. Upper portions of the side walls 26, and upper portions of the first and second end walls 25, 23 together form the outer depressed portion. A female connector 27 electrically connected to a motherboard (not shown) of the portable computer extends into the inner depressed portion through the lower portion of the first end wall 25. A pivot hole 28 is defined in the lower portion of each side wall 26 adjacent the first end wall 25. A cutout 30 is formed in a middle of the upper portion of one side wall of the side walls 26. A locking hole 32 is defined in the mounting board 22 at the cutout 30. A pair of locating slots 34 is defined in the other side wall of the side walls 26.

The bracket 60 having a U shape includes two legs 62 parallel to each other, and a beam 64 connected between corresponding ends of the legs 62. A pivot shaft 66 perpendicularly protrudes out from a distal end of each leg 62. A wedge-shaped projecting portion 72 protrudes out from each leg 62 opposite to a corresponding pivot shaft 66. Two inner receiving slots 70 are defined in an inner surface of a lower portion of each leg 62 at opposite ends. Two outer receiving slots 68 each aligned with a corresponding inner receiving slot 70 are defined in an outer surface of the lower portion of each leg 62 at opposite ends. An area of each outer receiving slot 68 is larger than that of a corresponding inner receiving slot 70. A slanting drive portion 71 is formed on each leg 62 at a bottom of the inner receiving slot 70. The drive portion 71 is located at a side of the inner receiving slot 70, away from the pivot shaft 66. A flexible second operating member 74 is mounted to a middle of the beam 64.

The cover 80 includes a pair of locating tabs 82 extending from a side thereof, and a locking tab 84 extending from an opposite side thereof. A through-hole 86 is defined in the locking tab 84.

Referring also to FIGS. 2 to 8, in assembling the bracket 60 to the mounting board 22, the bracket 60 is pivotably mounted to the mounting board 22 via the pivot shafts 66 thereof, being pivotably received in the corresponding pivot holes 28 of the mounting board 22.

In preparation for installing the data storage device 40, the beam 64 of the bracket 60 is located out of the depressed portion of the mounting board 22. In installing the data storage device 40, the data storage device 40 is placed in the inner depressed portion of the mounting board 22 with the male connector 41 thereof facing the female connector 27 of the portable computer with a gap therebetween. The bracket 60 is pivoted down. The drive portions 71 of the bracket 60 cooperate with the neck portions 46 of the corresponding protrusions 44 to drive the data storage device 40 to move toward the female connector 27 of the portable computer (see FIG. 7). The bracket 60 is further pivoted down until the bracket 60 is accommodated in the inner depressed portion. The male connector 41 of the data storage device 40 is inserted into the female connector 27. The neck portions 46 of the protrusions 44 of the data storage device 40 are received in the corresponding inner receiving slots 70 (see FIG. 8). The head portions 47 of the protrusions 44 of the data storage device 40 are received in the corresponding outer receiving slots 68. The wedge-shaped projecting portions 72 of the bracket 60 abut against the corresponding side walls 26 of the depressed portion. Thus, the data storage device 40 is installed to the mounting board 22. The cover 80 is mounted to the mounting board 22 to press the bracket 60 and the data storage device 40. The locating tabs 82 are inserted into the corresponding locating slots 34 of the mounting board 22. The locking tab 84 is accommodated in the cutout 30 of the mounting board 22. Thus, the cover 80 is received in the outer depressed portion of the mounting board 22. A screw 88 is inserted through the through-hole 86 of the cover 80 and engaged in the locking hole 32 of the mounting board 22 to secure the cover 80 to the mounting board 22.

In disassembling the data storage device 40, the screw 80 is removed, and the locating tabs 82 are disengaged from the locating slots 34 of the mounting board 22. The cover 80 is removed. The bracket 60 is pivoted by pulling the second operating member 74 thereof. The legs 62 of the bracket 60 are moved away, with the inner and outer receiving slots 70, 68 thereof releasing the corresponding protrusions 44 of the data storage device 40. Thus, the data storage device 40 is easily removed from the mounting board 22 via pulling the first operating member 48 thereof.

It is believed that the present embodiment and its advantage will be understood from the foregoing description, and it will be apparent that various changes may be made thereto without departing from the spirit and scope of the invention or sacrificing all of its material advantages, the example hereinbefore described merely being a preferred or exemplary embodiment of the invention.

What is claimed is:

1. A mounting apparatus for mounting a data storage device that has a protrusion protruding from a sidewall thereof, the mounting apparatus comprising:
    a mounting board comprising a depressed portion configured for holding the data storage device, the depressed portion comprising a first side wall; and
    a bracket comprising a leg member with an end pivotably mounted to the first side wall of the depressed portion of the mounting board, a first receiving slot defined in a bottom of the leg member, configured for receiving the protrusion of the data storage device, a drive portion formed at a side of the receiving slot, configured for cooperating with the protrusion of the data storage device when installing the data storage device.

2. The mounting apparatus as claimed in claim 1, wherein a pivot shaft protrudes from the end of the leg member of the bracket, a pivot hole is defined in the first side wall of the depressed portion of the mounting board, for pivotably receiving the pivot shaft.

3. The mounting apparatus as claimed in claim 2, wherein the depressed portion further comprises an end wall at an end of the first side wall, adjacent the pivot hole, a connector protrudes into the depressed portion through the end wall, configured for electrically connecting to the data storage device.

4. The mounting apparatus as claimed in claim 1, wherein a projecting portion protrudes from the leg member of the bracket, for abutting against the first side wall of the depressed portion of the mounting board.

5. The mounting apparatus as claimed in claim 1, further comprising a cover for the bracket and the data storage device that are received in the depressed portion of the mounting board.

6. The mounting apparatus as claimed in claim 5, wherein the depressed portion having a stepped shape has an inner depressed portion at a lower portion thereof configured for holding the data storage device, and an outer depressed portion at an upper portion thereof for holding the cover.

7. The mounting apparatus as claimed in claim 6, wherein a locating tab protrudes from a side of the cover, and an upper portion located in the outer depressed portion, of the first side wall, defines a locating slot therein, for receiving the locating tab.

8. The mounting apparatus as claimed in claim 7, wherein a locking tab extends from an opposite side of the cover, the depressed portion further comprises a second side wall opposite to the first side wall, a cutout is defined in an upper portion located in the outer depressed portion, of the second side wall, for receiving the locking tab.

9. The mounting apparatus as claimed in claim 8, wherein a locking hole is defined in the mounting board at the cutout, a through-hole is defined in the locking tab of the cover, a screw is inserted through the through-hole of the cover to engage in the locking hole of the mounting board.

10. An electronic device, comprising:
    a data storage device comprising two protrusions respectively at opposite sidewalls thereof;
    a mounting board comprising a depressed portion for holding the data storage device, the depressed portion comprising two opposite side walls; and
    a bracket comprising two parallel leg members each with an end pivotably mounted to a corresponding side wall of the depressed portion of the mounting board, a first receiving slot defined in a bottom of each of the leg members, for receiving a corresponding protrusion of the data storage device, a drive portion formed at a side of each of the receiving slots, for cooperating with a corresponding protrusion of the data storage device when installing the data storage device.

11. The electronic device as claimed in claim 10, wherein a pivot shaft protrudes from the end of each of the leg members of the bracket, a pivot hole is defined in each of the side walls of the depressed portion of the mounting board, for pivotably receiving a corresponding pivot shaft.

12. The electronic device as claimed in claim 11, wherein the depressed portion further comprises an end wall connected between corresponding ends of the side walls, adjacent the pivot hole, a connector protrudes into the depressed portion through the end wall, for electrically connecting to the data storage device.

13. The electronic device as claimed in claim 10, wherein a projecting portion protrudes from each of the leg members of the bracket, for abutting against a corresponding side wall of the depressed portion of the mounting board.

14. The electronic device as claimed in claim 10, further comprising a cover for covering the depressed portion of the mounting board.

15. The electronic device as claimed in claim 14, wherein the depressed portion having a stepped shape has an inner depressed portion at a lower portion thereof for holding the data storage device, and an outer depressed portion at an upper portion thereof for holding the cover.

16. The electronic device as claimed in claim 10, wherein the data storage device has an operating member mounted thereto.

17. The electronic device as claimed in claim 10, wherein the bracket further comprises a beam connected between opposite ends of the legs.

18. The electronic device as claimed in claim 17, wherein an operating member is mounted to the beam of the bracket.

19. An electronic device comprising:

a data storage device comprising two protrusions respectively at opposite sidewalls thereof, and a connector formed at an end thereof;

a mounting board comprising a depressed portion for accommodating the data storage device therein and a complementary connector arranged at an end of the depressed portion, the depressed portion comprising two opposite side walls; and a bracket comprising two leg members each pivotably mounted to a corresponding side wall of the depressed portion of the mounting board, a drive portion formed at each of the leg members and configured for cooperating with a corresponding protrusion of the data storage device to drive the data storage device to move toward the complementary connector whereby the connector connects with the complementary connector when the bracket is pivoted to engage with the mounting board; and a cover detachably secured to the mounting board for covering and pressing the bracket and the data storage device.

20. The electronic device as claimed in claim 19, wherein a projecting portion protrudes laterally from each of the leg members of the bracket, for abutting against a corresponding side wall of the depressed portion of the mounting board.

* * * * *